United States Patent
Busin et al.

(10) Patent No.: US 8,543,137 B2
(45) Date of Patent: Sep. 24, 2013

(54) METHOD FOR PROVIDING LOCATION BASED SERVICES

(75) Inventors: Åke Busin, Sollentuna (SE); Hui Yang, Shanghai (CN)

(73) Assignee: Telefonaktiebolaget L M Ericsson (Publ)., Stockholm (SE)

( * ) Notice: Subject to any disclaimer, the term of this patent is extended or adjusted under 35 U.S.C. 154(b) by 0 days.

(21) Appl. No.: 13/584,234

(22) Filed: Aug. 13, 2012

(65) Prior Publication Data
US 2013/0045756 A1  Feb. 21, 2013

(51) Int. Cl.
*H04Q 7/20* (2006.01)

(52) U.S. Cl.
USPC ............ 455/456.5; 455/456.1; 455/432.1; 455/435.1

(58) Field of Classification Search
USPC ...... 455/456.5, 456.1, 432.1, 435.1; 370/331
See application file for complete search history.

(56) References Cited

U.S. PATENT DOCUMENTS

| | | | |
|---|---|---|---|
| 2009/0024601 A1* | 1/2009 | Zmolek | 707/4 |
| 2009/0270097 A1* | 10/2009 | Gallagher et al. | 455/435.1 |
| 2010/0041418 A1* | 2/2010 | Edge et al. | 455/456.2 |
| 2010/0260141 A1* | 10/2010 | Chowdhury et al. | 370/331 |
| 2011/0195721 A1* | 8/2011 | Harindranath | 455/456.1 |

* cited by examiner

*Primary Examiner* — Danh Le
(74) *Attorney, Agent, or Firm* — Rothwell, Figg, Ernst & Manbeck, P.C.

(57) ABSTRACT

The present invention relates to a method for providing location based services for a client in an infrastructure network. The network comprises at least one Home Subscriber Server, HSS, at least one Mobility Management Entity, MME, and at least one Gateway Mobile Location Centre, GMLC, for the client. The GMLC sending an UE location service response to the client based on a UE location service request received from the client. The network performs the steps of: (A) the GMLC continuously receives and stores event reports streamed from the MME(s), the reports comprising information about the MME identity and identities for UE(s) served by said MME; (B) the GMLC determines the identity of a serving MME for the UE in the UE location service request on the basis of the information in the event reports.

14 Claims, 4 Drawing Sheets

METHOD FOR PROVIDING LOCATION BASED SERVICES

This application claims priority under 35 U.S.C. Section 119(a) to PCT/EP2011/064042 filed Aug. 15, 2011, which is incorporated by reference in its entirety.

TECHNICAL FIELD

The present invention relates to a method for providing location based services for a client in an infrastructure network. The present invention also relates to a Gateway Mobile Location centre adapted for the same purpose.

BACKGROUND ART

Mobile Positioning System (MPS) helps a service provider to tailor content to meet users' needs. It brings information on the location of a user's mobile device to existing mobile applications, which enables the service provide to adapt services on the basis of the location of the device. It interacts with its clients using defined and secure interfaces. MPS at least comprise a Gateway Positioning Center (GMPC) and a Location Services (LCS) client. In addition, MPS utilizes network features in core and radio network nodes, such as Home Location Register (HLR), Mobile Switching Center (MSC) and Serving GPRS Support Node (SGSN).

MPS normally have support for Control Plane (CP) positioning architecture in GSM (Global System for Mobile communication), WCDMA (Wideband Code Division Multiple Access) and LTE (Long Term Evolution) mobile networks. In the CP positioning architecture, the GMLC first needs to query a Home Subscriber Server (HSS) to get a serving Mobility Management Entity (MME) name. The GMLC then send a request to the MME. This is illustrated in FIG. 1. Details of the diagram in FIG. 1 can be retrieved from 3GPP 23.271 and will therefore not be described any further in this patent application.

To retrieve information of the serving MME and International Mobile Subscriber Identity (IMSI) from the HSS, it is required that the HSS supports the SLh interface between the HSS and the GMLC. As the SLh interface has limited use and business value relative other interfaces to the HSS it is likely that support of SLh will be lacking when a service provider wants to deploy a MPS system. It may also be the case that the HSS is not supported.

SUMMARY OF THE INVENTION

The object of the present invention is therefore to provide an alternative method to determine the serving MME.

The object of the present invention is solved by means of a method for providing location based services for a client in an infrastructure network. The network comprises at least one Home Subscriber Server, HSS, at least one Mobility Management Entity, MME, and at least one Gateway Mobile Location Centre, GMLC, for the client. The GMLC sends an UE location service response to the client based on a UE location service request received from the client. The network performs the steps of: (a) the GMLC continuously receives and stores event reports streamed from the MME(s), the reports comprising information about the MME identity and identities for UE(s) served by said MME, (b) the GMLC determines the identity of a serving MME for the UE in the UE location service request on the basis of the information in the event reports.

The object of the present invention is also solved by means of a Gateway Mobile Location Centre, GMLC, adapted for providing location based services for a client in an infrastructure network. The network comprises at least one Home Subscriber Server, HSS, at least one Mobility Management Entity, MME, and at least one GMLC, for the client. The GMLC is adapted to send an UE location service response to the client based on a UE location service request received from the client. The GMLC is particularly characterized in that the GMLC is adapted to continuously receive and store event reports streamed from the MME(s). The reports comprises information about the MME identity and identities for UE(s) served by said MME. The GMLC is further adapted to determine the identity of a serving MME for the UE in the UE location service request on the basis of the information in the event reports.

The present invention provides a method which removes the dependency of support for SLh interface on the HSS when deploying Location Based Services (LBS). This will enable a wider deployment of LBS. The invention also allows for deployment of LBS without using SLh interface even if it is supported by Home Subscriber Server (HSS). This will reduce the workload on the HSS and avoid potential costs for SLh features on the HSS.

BRIEF DESCRIPTION OF THE DRAWINGS

The invention will be described in greater detail in the following, with reference to the embodiments that are shown in the attached drawings.

DETAILED DESCRIPTION

The embodiments of the invention with further developments described in the following are to be regarded only as examples and are in no way to limit the scope of the protection provided by the patent claims.

The present invention relates to a method for providing location based services for a client in an infrastructure network. The present invention also relates to a Gateway Mobile Location centre adapted for the same purpose. Even though the detailed description describes the method performed by this entities/network, the person skilled in the art realizes that this entities/network adapted to perform these method steps is also disclosed in the description.

Figure 1:
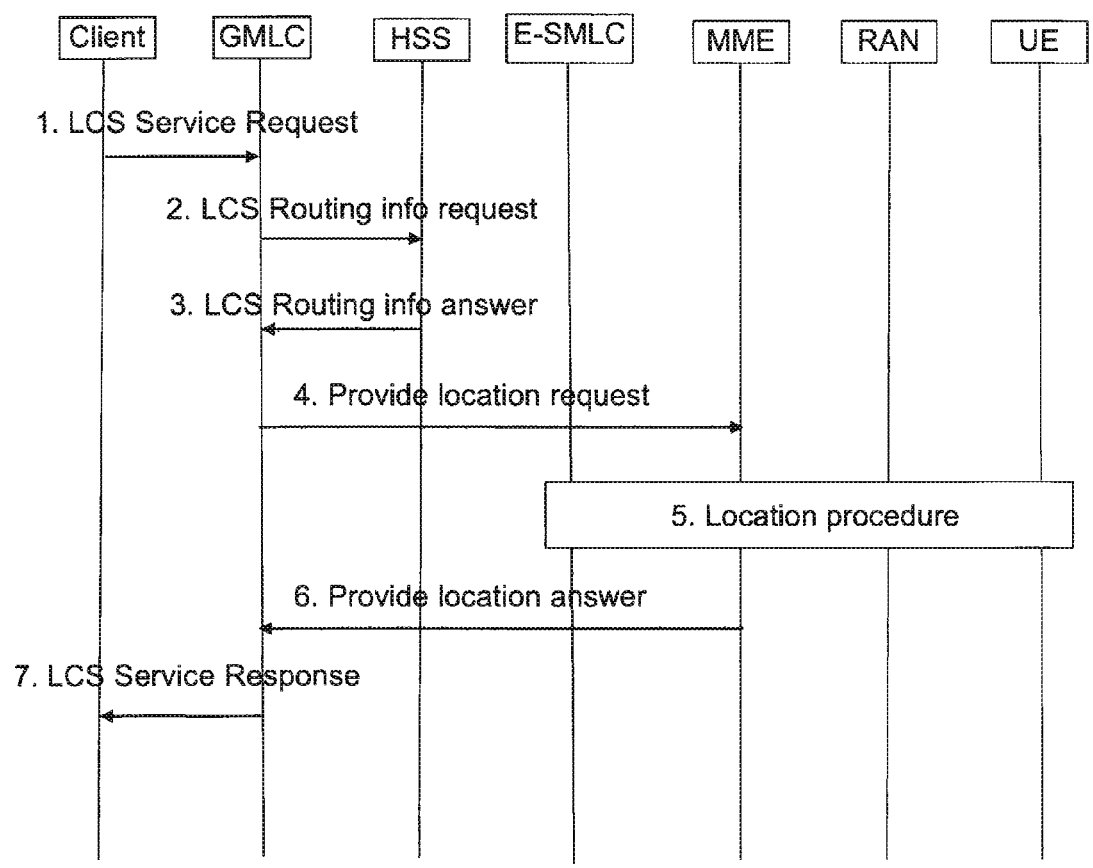
FIG. 1 illustrates a control plane setup for a positioning service according to prior art.
Figure 2:
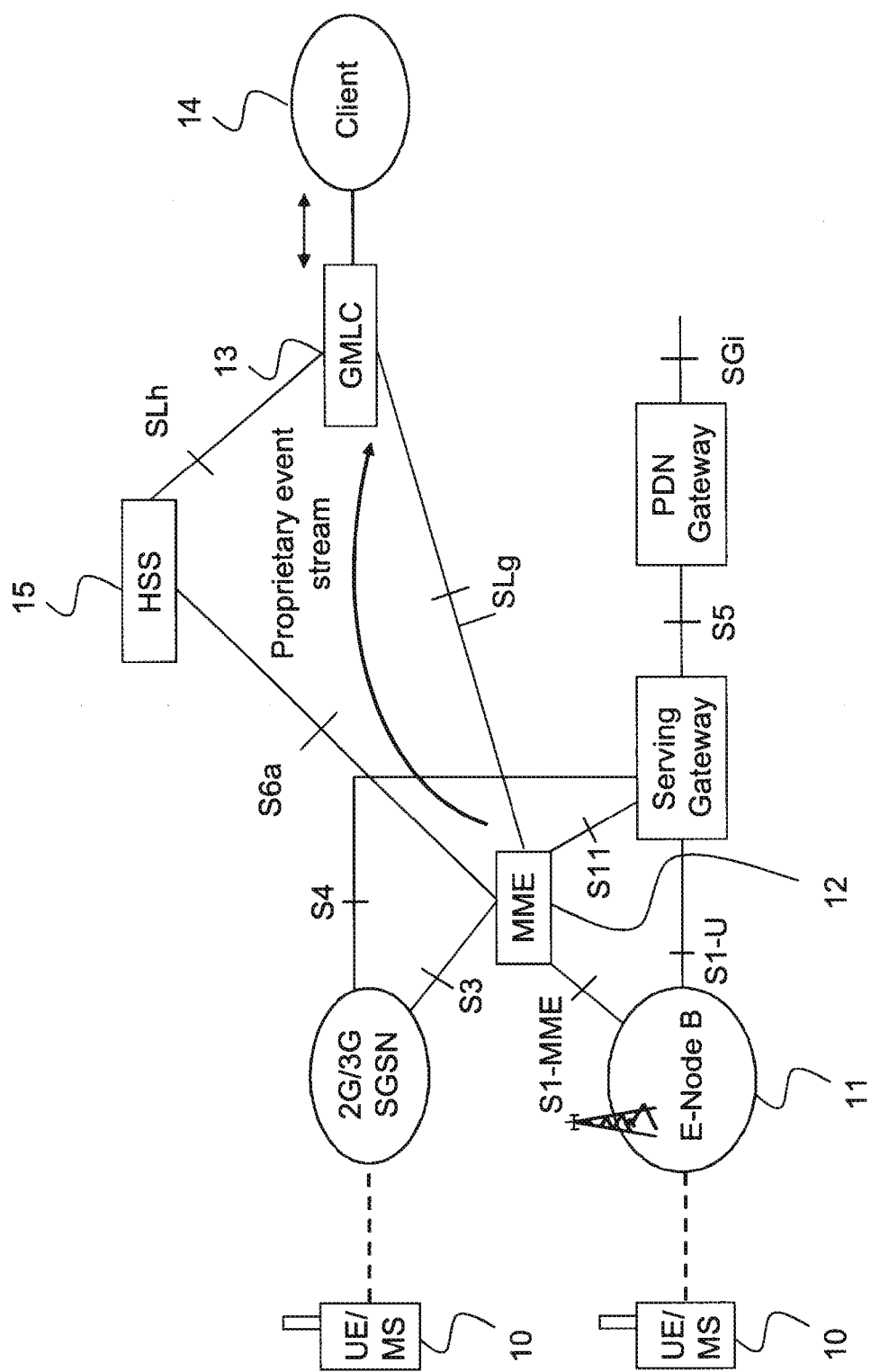
FIG. 2 illustrates the involved entities in the present invention.

FIG. 2 the involved entities in the present invention. The GMLC 13 and the client 14 are parts of a mobile positioning system in an infrastructure network, which system can be used by a service provider to determine the position of an UE 10. The infrastructure network, see FIG. 2, comprises at least one Home Subscriber Server 15, HSS, at least one Mobility Management Entity 12, MME, and at least one Gateway Mobile Location Centre 13, GMLC, for the client 14. The GMLC sends an UE location service response to the client based on a UE location service request received from the client.

To retrieve information of the serving MME and International Mobile Subscriber Identity (IMSI) from the HSS, it is required that the HSS supports the SLh interface between the HSS and the GMLC. As the SLh interface has limited use and business value relative other interfaces to the HSS it is likely that support of SLh will be lacking when a service provider wants to deploy a MPS system. It may also be the case that the HSS is not supported. It is therefore a need to provide an alternative method to determine the serving MME.

Figure 4:
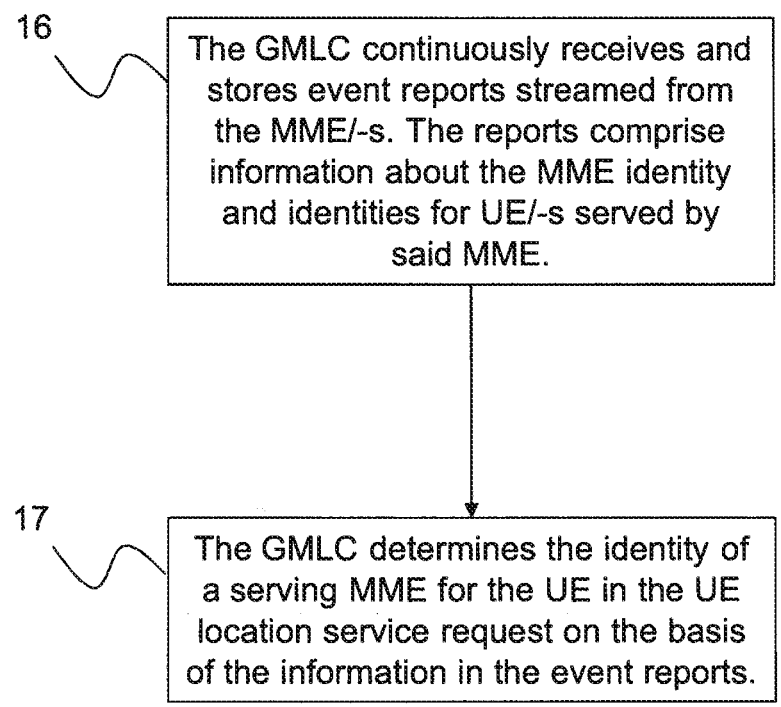
FIG. 4 illustrates the method according to the present invention.

This is solved by means of the following steps, see FIG. 4: (1) the GMLC 13 continuously receives and stores 16 event reports streamed from the MME(s) 12. The reports comprise information about the MME identity and identities for UE(s) served by said MME; (2) the GMLC 13 determines 17 the identity of a serving MME 12 for the UE in the UE location service request on the basis of the information in the event reports.

With these steps, the dependency of support for SLh interface on the HSS when deploying Location Based Services (LBS) is reduced. This will enable a wider deployment of LBS. This also allows for deployment of LBS without using SLh interface even if it is supported by Home Subscriber Server (HSS). This will reduce the workload on the HSS and avoid potential costs for SLh features on the HSS.

It is known that the MME may provide a stream of reports of events. These event reports include the terminal identities and cell identity. By ensuring that the event reporting stream is received by the GPMC and relevant part are stored, e.g. Terminal Id, Cell Id and timestamp, it is possible for the GMPC to always have the last known location of the terminal available.

The MME(s) are preferably configured to stream the event reports the GMLC. The GMLC continuously updates the stored event reports based on the latest received event reports.

The event reports that are reported include but are not limited to attach, detach and handover. The events reports include at least information of the terminal/UE identities, the MME identity, serving cell identities and the timestamp for each UE identity. The UE(s) identity in the event reports preferably consists in Mobile Station International Subscriber Directory Number, International Mobile Subscriber Identity, IMSI, or International Mobile Equipment Identity, IMEI.

The UE identity in the UE location request preferably consists in Mobile Station International Subscriber Directory Number, MSISDN. Other identity marks are also applicable. The GMLC 13 determines the identity of the serving MME 12 when receiving a location service request from the client 14. The GMPC will search in the database of stored event reports to find the latest report that includes the specific terminal identity. From the event report the GMPC can find the serving MME identity.

The GMLC further derives an MME diameter name based on the determined identity of the serving MME. This diameter name is used on the SLg interface. The translation from MME id to the MME Diameter name can be based on a provisioned table in the GMLC. The GMLC will then use the derived MME Diameter name when sending a Provide Location Request to the MME 12 serving the terminal. When receiving the UE location service request, the GMLC 13 sends a UE location request to the identified serving MME with information about the UE in the UE location service request. The MME 12 then provides the location of the UE to the GMLC in response to said UE location request.

Figure 3:
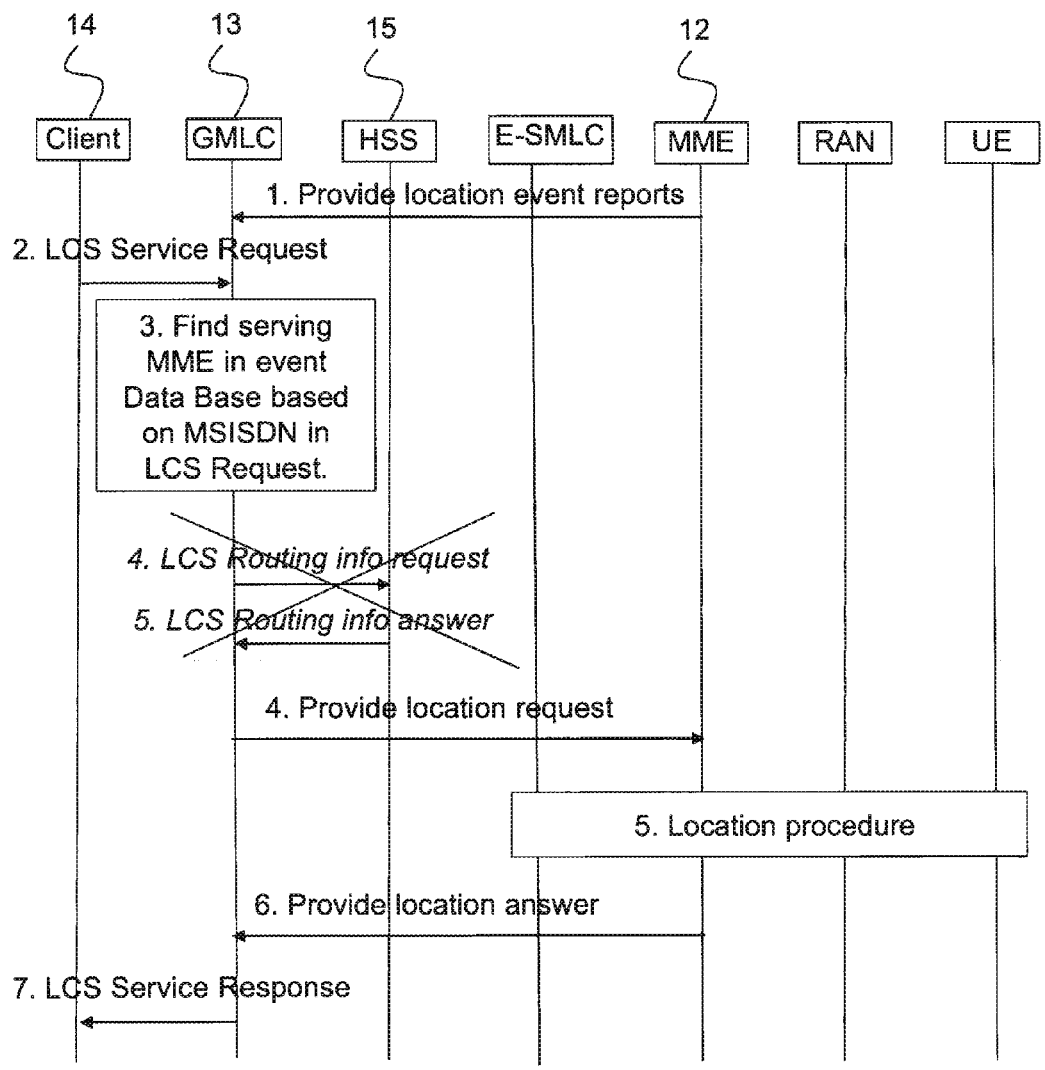
FIG. 3 illustrates a control plane setup for a positioning service according to the present invention.

FIG. 3 illustrates an example of a control plane setup for a positioning service according to the present invention. The following procedure is performed:

(1) The MME(s) 12 streams the event reports to the GMLC 13. (The GMLC continuously updates the stored event reports based on the latest received event reports);

(2) The LCS Client 14 sends an LCS Service Request with UE identity to the GMLC 13;

(3) The GMLC 13 determines the identity of the serving MME 12. (The GMPC will search in the database of stored event reports to find the latest report that includes the specific UE identity);

(4) The GMLC sends a Provide Location Request to the identified MME 12 serving the terminal;

(5) The MME performs a location procedure to determine the location of the UE in the Location Request;

(6) The MME 12 then provides the location of the UE to the GMLC in response to said UE location request;

(7) The UE location is reported back to the LCS Client.

It will be appreciated by a person skilled in the art that the invention is not to be regarded as being limited to the embodiments described above, a number of additional variants and modifications being possible within the scope of the subsequent patent claims.

The invention claimed is:

1. A method for providing location based services for a client in an infrastructure network, the network comprising at least one Home Subscriber Server, HSS, at least one Mobility Management Entity, MME, and at least one Gateway Mobile Location Centre, GMLC, for the client, comprising the steps of:

the GMLC receiving a UE location service request from the client, the GMLC receiving and storing event reports streamed from the MME, the reports comprising information about the MME identity and identities for a UE served by said MME, the GMLC determining the identity of a serving MME for a UE in the UE location service request on the basis of the information in the event reports, and the GMLC sending a UE location service response to the client.

2. The method according to claim 1, wherein the UE identity in the event reports consists in Mobile Station International Subscriber Directory Number, MSISDN, International Mobile Subscriber Identity, IMSI, or International Mobile Equipment Identity, IMEI.

3. The method according to claim 1, wherein the UE identity in the UE location request consists in Mobile Station International Subscriber Directory Number, MSISDN.

4. The method according to claim 1, wherein the MME is configured to stream the event reports to the GMLC.

5. The method according to claim 1, wherein the GMLC continuously updates the stored event reports based on the latest received event reports.

6. The method according to claim 1, wherein the event reports comprise information about the timestamp for each UE identity and serving cell identities.

7. The method according to claim 1, wherein the GMLC when receiving the UE location service request sends a UE location request to the identified serving MME with information about the UE in the UE location service request, the MME providing the location of the UE to the GMLC in response to said UE location request.

8. The method according to claim 1, wherein the GMLC determines the identity of the serving MME when receiving a location service request from the client.

9. The method according to claim 1, wherein the GMLC derives an MME diameter name based on the determined identity of the serving MME.

10. A gateway mobile location centre, GMLC, adapted for providing location based services for a client in an infrastructure network, the network comprising at least one Home Subscriber Server, HSS, at least one Mobility Management Entity, MME, and at least one GMLC, for the client, the GMLC being adapted to send an UE location service response to the client based on a UE location service request received from the client, wherein the GMLC is adapted to continuously receive and store event reports streamed from the MME(s), the reports comprising information about the MME identity and identities for UE(s) served by said MME, and the GMLC is further adapted to determine the identity of a serving MME for the UE in the UE location service request on the basis of the information in the event reports.

11. The GMLC according to claim 10, wherein the GMLC is adapted to continuously update the stored event reports based on the latest received event reports.

12. The GMLC according to claim 10, wherein the GMLC, when receiving the UE location service request, is adapted to provide a location request to the identified serving MME with information about the UE in the UE location service request.

13. The GMLC according to claim 10, wherein the GMLC is adapted to determine the identity of the serving MME when receiving a location service request from the client.

14. The GMLC according to claim 10, wherein the GMLC is adapted to derive an MME diameter name based on the determined identity of the serving MME.

* * * * *